United States Patent

Markusch et al.

[11] Patent Number: 5,308,657
[45] Date of Patent: May 3, 1994

[54] PROTECTION OF FURNITURE EDGING

[75] Inventors: Peter H. Markusch, McMurray; Hans-Joachim Kogelnik, Pittsburgh; Jeffrey F. Dormish, Pittsburgh; Norbert Adam, Pittsburgh, all of Pa.

[73] Assignee: Miles Inc., Pittsburgh, Pa.

[21] Appl. No.: 757,779

[22] Filed: Sep. 11, 1991

[51] Int. Cl.$^5$ .............................................. B05D 5/00
[52] U.S. Cl. ................................... 427/284; 427/369; 427/393
[58] Field of Search ................ 427/393, 284, 440, 369

[56] References Cited

U.S. PATENT DOCUMENTS

| | | | |
|---|---|---|---|
| 3,714,127 | 1/1973 | Fabris | 260/77.5 AM |
| 3,812,003 | 5/1974 | Larson et al. | 161/156 |
| 3,935,051 | 1/1976 | Bender et al. | 156/331 |
| 3,979,364 | 9/1976 | Rowton | 260/77.5 AM |
| 4,156,064 | 5/1979 | Falkenstein et al. | 528/46 |
| 4,336,298 | 6/1982 | Schwarz | 428/285 |
| 4,444,976 | 4/1984 | Rabito | 528/60 |
| 4,552,934 | 11/1985 | Rabito et al. | 525/458 |
| 4,728,710 | 3/1988 | Goel | 528/58 |
| 4,732,957 | 3/1988 | Schuster et al. | 427/385.5 X |
| 4,743,672 | 5/1988 | Goel | 528/44 |
| 4,876,308 | 10/1989 | Melby et al. | 524/780 |
| 4,923,756 | 5/1990 | Chung et al. | 428/423.7 |
| 5,059,672 | 10/1991 | Engebretson | 528/64 |

FOREIGN PATENT DOCUMENTS 1048876 2/1989 Japan.

Primary Examiner—Michael Lusignan
Attorney, Agent, or Firm—Joseph C. Gil; N. Denise Brown

[57] ABSTRACT

The invention is directed to a process for protecting the edges of a panel by applying a non-sagging polyurethane composition to the edges of said panel, and allowing the composition to cure.

6 Claims, No Drawings

PROTECTION OF FURNITURE EDGING

BACKGROUND OF THE INVENTION

The present invention relates to the protection of the edges of panels. More particularly, the invention relates to the protection of edges of panels used for construction and furniture (such as, e.g., tables).

In recent years, there has been an increasing demand for more safety for furniture in offices, schools, nurseries, kindergartens and homes. In general, the industry has attempted to apply protective edging to panels used to produce various types of furniture. In one commercially used process, a U-shaped groove is cut around and into the edge of the panel to be protected. A polyurethane composition is then poured into the groove. Once the polyurethane composition has cured, the panel edge portion making up the outside border of the U-shaped groove is removed with a router. The edge must then be routed to remove excess polyurethane and routed again to shape the polyurethane composition. Finally, the edge is sanded to its final surface smoothness. Obviously, this technique is very labor intensive.

In addition, techniques have been developed which utilize complex molds (see, e.g., U.S. Pat. No. 4,738,813).

Non-sagging polyurethane compositions are known in the polyurethane art. Such compositions have been described as useful adhesives and to repair cracks and voids (see, U.S. Pat. Nos. 4,336,298, 4,444,976, and 4,944,540, and U.S. application Ser. No. 07/465,715, filed on Jan. 16, 1990, now U.S. Pat. NO. 5,164,473 patented Nov. 17, 1992, and Ser. No. 07/513,466, filed on Apr. 19, 1990, now U.S. Pat. No. 5,166,303, patented Nov. 7, 1992.

It is an object of the present invention to protect the edges of panels in a simple, efficient manner.

DESCRIPTION OF THE INVENTION

The present invention is directed to a process for protecting the edges of a panel comprising:
a) applying a non-sagging polyurethane composition to the edges of said panel,
b) allowing said composition to cure, and
c) optionally, sanding or machining the cured composition to final edge shape desired.

In one embodiment, the non-sagging polyurethane composition is applied to the edge using an applicator having a round or oval opening. In another embodiment, once the composition is applied and before curing, it is shaped using a squeegee having the desired shape.

The key to the present invention resides in using a non-sagging polyurethane composition. Such compositions are known and are described in U.S. Pat. Nos. 4,336,298, 4,444,976, and 4,994,540, and U.S. application Ser. No. 07/465,715, filed on Jan. 16, 1990 and Ser. No. 07/513,466, filed on Apr. 19, 1990, all the disclosures of which are herein incorporated by reference.

The non-sagging polyurethane composition is prepared by mixing:
a) a liquid polyisocyanate having an isocyanate group content of from about 10% by weight to about 15% by weight, and preferably from about 15% by weight to about 35% by weight, with
b) a liquid isocyanate reactive mixture comprising:
i) from 40 to 95 parts by weight, and preferably from 55 to 80 parts by weight, of one or more hydroxyl group containing compounds containing from 2 to 8 hydroxyl groups and having a molecular weight of from about 450 to about 6000,
ii) from 1 to 10 parts by weight, and preferably from 3 to 6 parts by weight, of one or more organic di- or polyamines,
iii) from 0 to 50 parts by weight, preferably from 2 to 50 parts by weight, and, most preferably from 15 to 35 parts by weight, of one or more low molecular weight diols of triols having hydroxyl equivalent weights of about 100 or less, and
iv) from 0 to 2.0 parts by weight of water,
wherein said parts by weight total 100, and wherein the amounts of component a) and component b) are such that the equivalent ratio of isocyanate groups to hydroxyl and amine groups is from 0.8:1 to 2:1, and preferably from 1:1 to 1.5:1.

In the preferred embodiment, non-sagging compositions which show no or very little volume increase are used to avoid porosity. The finished edging should be smooth, non-porous and paintable.

It is generally preferred to include fillers, such as glass, talc, clay, calcium carbonate, silica, and the like, in the composition.

The isocyanates useful herein are known. They are liquid polyisocyanates having isocyanate group contents of from about 10 to about 50% by weight, and preferably from 15 to 35% by weight. It is generally preferred that the isocyanates used have a viscosity of less than 15,000 mPas at 25° C. It is also preferred that the isocyanate used be non volatile at ambient temperature. Typically, useful isocyanates will have vapor pressures at 25° C. of less than 0.05 mm Hg or boiling points of more than 130° C. at 10 mm Hg. The presently preferred isocyanates are polymethylene poly(phenyl isocyanates) having NCO contents of from 15 to 32% by weight, and viscosities of from 40 to 3,000 mPas at 25° C., and liquid adducts of such isocyanates with polyols. Also useful herein are light stable isocyanates such as methylenebis(cyclohexyl isocyanate).

The liquid isocyanate reactive mixture useful herein contains i) a relatively high molecular weight polyol, ii) an organic di- or polyamine, iii) optionally, a relatively low molecular weight diol or triol, and iv) optionally, water.

The relatively high molecular weight polyol must have a molecular weight of from about 450 to about 6000 and contains from 2 to 8 hydroxyl groups. Such polyols are generally known in the polyurethane art and include polyethers, polyesters, polyester amides and polycarbonates. Polyether polyols are generally preferred. As is known in the art, polyether polyols are generally alkylene oxide adducts of diols, triols, and higher functionality polyols, amines and aminoalcohols. The alkylene oxide may suitably be ethylene oxide, 1,2-propylene oxide or 1,2-butylene oxide or a mixture of some or all of these. Also useful are polytetramethylene glycols which, as known in the art, can be obtained via the ring opening polymerization of tetrahydrofuran.

Among the useful polyether polyols are the so-called PHD polyols which are prepared by reacting an organic diisocyanate and hydroazine in the presence of a polyether polyol. See, e.g., U.S. Pat. Nos. 3,325,421, 4,042,537 and 4,089,835. Also suitable are the so-called polymer polyols which are prepared by polymerizing styrene and acrylonitrile in the presence of a polyether.

These have been disclosed in U.S. Pat. Nos. 3,383,351, 3,304,273, 3,523,093, 3,652,639, 3,823,201 and 4,390,645.

Polyester amide polyols are known in the art and include the predominantly linear condensates obtained from polyvalent saturated and unsaturated carboxylic acids or their anhydrides and polyhydric saturated and unsaturated amines, alcohols, diamines, polyamines and mixtures thereof.

Suitable polycarbonate polyols include those which may be obtained by reacting diols such as 1,3-propane diol, 1,4-butane diol and/or 1,6-hexane diol, diethylene glycol, triethylene glycol and tetraethylene glycol with diaryl carbonate (such as diphenyl carbonate) or phosgene.

The polyester polyols useful herein are known in the art. It will however be understood that the term includes chain extended polyesters made from a glycol (e.g., ethylene and/or propylene glycol) and a saturated dicarboxylic acid (e.g. adipic acid as well as polycaprolactone diols). Other polyester polyols include poly-(ethylene adipate) glycol, poly(propylene adipate) glycol, poly(butylene adipate) glycol, poly(neopentyl sebacate) glycol, etc. Also, suitable polyester polyols include those obtainable by reacting such polyols as 1,4-butanediol, hydroquinone bis(2-hydroxyethyl)ether, ehtylene glycol, diethylene glycol, triethylene glycol, propylene glycol, dipropylene grlycol, 2-methyl-2-ethyl-1,3-propanediol, 2-ethyl-1,3-hexanediol, 1,5-pentanediol, thiodiglycol, 1,3-prpanediol, 1,3-butanediol, 2,3-butanediol, neopentyl glycol, 1,2-dimethyl-1,2-cyclopentanediol, 1,2-cyclohexanediol, 1,2-dimethyl-1,2-cyclohexanediol, glycerol, trimethylolpropane, trimethylol ethane, 1,2,4-butanetriol, 1,2,6-hexanetriol, pentaerythritol, dipentaerythritol, tripentaerythritol, mannitol, sorbitol, methyl-glycoside, and the like with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlorophthalic acid and chlorendic acid; the acid anhydrides and acid ahlides of these acids may also be used.

The organic di- and polyamines useful herein are also known and are described, e.g., in U.S. Pat. Nos. 3,714,127, 3,979,364, 4,444,976, 4,552,934, 4,728,710, and 4,743,672, the disclosures of which are hereby incorporated by reference. Such amines typically have molecular weights of at last 60 and include aliphatic, aromatic and cycloaliphatic diamines and triamines, preferably aromatic or cycloaliphatic ciamines. Particularly preferred are isphorone diamine, methylene bis(cyclohexyl amine), methylene bis(4-amino-3-methylcyclohexane) and diethyl toluene diamine. Other preferred amines include diethylene triamine, 1-methyl-3,5-diethyl-2,4-diaminobenzene and/or its mixture with up to 35 percent by weight, based on the mixture of 1-methyl-3,5-diethyl-2,6-diaminobenzene.

The relatively low molecular weight diols and triols useful herein are known in the polyurethane art. They are generally aliphatic diols and riols having equivalent weights of 100 or less. Specific examples include ethylene glycol, propylene glycol, 1,3-dihydroxypropane, 1,4-dihydroxy-butane, 1,6-dihydroxyhexane, glycerine, trimethylol propane and low molecular weight ethoxylation and/or propoxylation products of such diols and triols.

The non-sagging polyurethane compositions may optionally include catalysts. These include the conventional polyurethane catalysts, preferably tin catalysts and tertiary amine catalysts.

Suitable organic tin compounds include tin-(II) salts of carboxylic acids such as tin acetate, tin octoate, tin 2-ethylhexanoate and tin laurate, and the tin-(IV)-compounds such as dibutyl tin oxide, dibutyl tin dichloride, dibutyl tin diacetate, dibutyl tin dilaurate, and dibutyl tin maleate or dibutyl tin diacetate. Preferred tin catalysts include sulphur containing tin compound such as di-(octyl)-tin-(IV)-bis-thiomethyl or dimethyl tin-(IV)-bis-thiolauryl; dimethyltinbisthioglycolic acid hexyl ester; or dibutyl tin-bis-thioglycolic acid octyl ester. The above-mentioned catalysts can obviously be used as mixtures. Bismuth catalyst may also be used herein. Combinations of organic metal compounds with amino pyridines, hydrazino pyridines (German Auslegeschriften 2,434,185, 2,601,082 and 2,603,834) or 1,4-diazabi-cyclo-2,2,2-octane and/or conventional tertiary amino catalysts of the type usually used in polyurethane chemistry can also be used if desired. The catalysts when used are generally used in a quantity of 0.001 to 5% by weight, preferably 0.01 to 2% by weight based on the weight of all the components. The use of a catalyst brings about a shortening of the handling time of the system.

The components can be mixed in any way, e.g., by stirring them together, by combining them in a mixhead, or the like. It is possible to store the materials using a cartridge with a membrane separating the two components and a plunger to break the membrane for the application of the composition. Another simple way is to store premeasured amounts of the reactants in plastic bags and, when ready to use, to combine them in a plastic bag and mix them by kneading the bag. After mixing is complete, the material can be applied by squeezing it out of a hole made by cutting off a corner of the plastic bag. Alternatively, conventional mixing equipment used in the polyurethane art can be used.

The invention is further illustrated, but is not intended to be limited by the following examples in which all parts and percentages are by weight unless otherwise specified.

EXAMPLES

Polyol A

A polyol blend was prepared from 118.9 parts of a poly(propylene oxide) diol (equivalent weight 212): 10.3 parts of a poly(propylene oxide)triol (equivalent weight 152); 3.5 parts of bis(4-aminocyclohexyl)methane (molecular weight 210); 13.3 parts of sodium potassium aluminosilicate in castor oil; 34 parts of talc; and 0.05 parts of dimethyltin dilaurate catalyst. This blend has a viscosity of 570 mPa.s at 25° C.

Polyol B

A polyol blend was prepared from 41.3 parts of a poly(propylene oxide) triol capped with ethylene oxide (equivalent weight 2000); 62.4 parts of a poly(propylene oxide)triol (equivalent weight 152); 3.5 parts of bis(4-aminocyclohexyl)methane (molecular weight 210); 13.3 parts of sodium potassium aluminosilicate in castor oil; 34 parts of talc; and 0.05 parts of dimethyl tin dilaurate catalyst. This blend has a viscosity of 5050 mPa.s at 25° C.

Polyol C

A polyol blend was prepared from 54.6 parts of a poly(propylene oxide)diol (equivalent weight 500); 49.1 parts of a poly(propylene oxide)triol (equivalent weight 152); 3.5 parts of bis(4-aminocyclohexyl)methane (molecular weight 210); 13.3 parts of sodium potassium aluminosilicate in castor oil; 34 parts of talc; and 0.05 parts of dimethyltin dilaurate catalyst. This blend has a viscosity of 2730 mPa.s at 25° C.

Isocyanate A

A urethane-modified polyisocyanate having an NCO content of 27% was prepared by reacting 71.5 parts of a polymethylene poly(phenyl isocyanate) (2,4'-isomer content of about 19% and NCO functionality of about 2.4) with 13.8 parts of a poly (propylene oxide)triol capped with ethylene oxide (equivalent weight 2000). Talc (36.5 parts) was blended with the modified polyisocyanate to yield a composition with an isocyanate content of 18.2% and a viscosity of 8400 mPa.s at 25° C.

EXAMPLE 1

10 parts of Polyol A was weighted into a 5×6 inch plastic bag which was placed inside a plastic cup on a balance. Subsequently, 9.2 parts of Isocyanate A were added to the polyol and the bag was then lifted out of the plastic cup. The air was carefully pressed out of the bag and then the bag was closed. Kneading the material by hand was the technique used for mixing (to assure that air did not get mixed with the material). After mixing the material in the bag for approximately one minute, the corner of the bag was cut and the material was squeezed out in the form of a bead and applied to the sides of the particle board. Good non-sag properties were observed (the material stayed in place without flowing). Subsequently, a piece of metal which was formed into a half moon shape was used to shape the material. Once the material was shaped, one sample was cured in the oven at 80° C. for one hour and another one was cured for 24 hours at room temperature. After the samples were cured they had a shore D hardness of 77, and they also showed good adhesion to the wood. The adhesion was tested by performing the wedge test as described in SAE J1882, issued August 1987. The test demonstrated that the particle board actually broke apart, leaving a layer of wood stuck to the edging compound.

EXAMPLE 2

10 parts of Polyol B was weighed into a 5×6 inch plastic bag which was placed inside a plastic cup on a balance. Subsequently, 7.7 parts of Isocyanate A was added to the polyol and the bag was then lifted out of the plastic cup. The air was carefully pressed out of the bag and then the bag was closed. Kneading the material by hand was the technique used for mixing (to assure that air did not get mixed with the material). After mixing the material in the bag for approximately one minute, the corner of the bag was cut and the material was squeezed out in the form of a bead and applied to the sides of the particle board. Good non-sag properties were observed (the material stayed in place without flowing). Subsequently, a piece of metal which was formed into a half moon shape was used to shape the material. Once the material was shaped, one sample was cured in the oven at 80° C. for one hour and another one was cured for 24 hrs. at room temperature. After the samples were cured they had a shore D hardness of 78, and they also showed good adhesion to the wood. The adhesion was tested by performing the wedge test. The test demonstrated that the particle board actually broke apart, leaving a layer of wood stuck to the edging compound.

EXAMPLE 3

10 parts of Polyol C were weighed into 5×6 inch plastic bag which was placed inside a plastic cup on a balance. Subsequently, 7.7 parts of Isocyanate A were added to the polyol and the bag was then lifted out of the plastic cup. The air was carefully pressed out of the bag and then the bag was closed. Kneading the material by hand was the technique used for mixing (to assure that air did not get mixed with the material). After mixing the material in the bag for approximately one minute, the corner of the bag was cut and the material was squeezed out in the form of a bead and applied to the sides of the particle board or plywood. Good non-sag properties were observed (the material stayed in place without flowing). Subsequently, a piece of metal which was formed into a half moon shape was used to shape the material. Once the material was shaped, one sample was cured in the oven at 80° C. for one hour and another one was cured for 24 hrs. at room temperature. After the samples were cured they had a shore D hardness of 77, and they also showed good adhesion to the wood. The adhesion was tested by performing the wedge test. The test demonstrated that the particle board actually broke apart, leaving a layer of wood stuck to the edging compound.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for protecting the edges of a panel wherein said panel consists of wood or wood by-products, said process comprising:
    a) applying a non-sagging polyurethane composition to the edges of said panel,
    b) shaping said composition to the desired final shape or form, and
    c) allowing said composition to cure, wherein said non-sagging polyurethane composition is prepared by mixing:
   1) a liquid polymethylene poly(phenyl isocyanate) having an isocyanate group content of from about 15 to 32% by weight and a viscosity of less than 15,000 mPa.s at 25° C,
with
   2) a liquid isocyanate reactive mixture comprising:
      i) from 40 to 95 parts by weight of one or more hydroxyl group containing compounds containing from 2 to 8 hydroxyl groups and having a molecular weight of from about 450 to about 6000,
      ii) from 1 to 10 parts by weight of one or more organic di- or polyamines,
      iii) from 0 to 50 parts by weight of one or more low molecular weight diols or triols having hydroxyl equivalent weights of about 100 or less, and
      iv) from 0 to 2.0 parts by weight of water, wherein said parts by weight total 100, and wherein the amount of component 1) and component 2) are such that the equivalent ratio of isocyanate groups to hydroxyl and amine groups is from 0.8:1 to 2:1.

2. The process of claim 1 wherein the cured composition is sanded or machined to the final edge shape desired.

3. The process of claim 1 wherein said liquid isocyanate reactive mixture 2) comprises:
  i) from 55 to 80 parts by weight of component 2) i),
  ii) from 3 to 6 parts by weight of component 2) ii),
  iii) from 15 to 35 parts by weight of component 2) iii), and
  iv) from 0 to 2.0 parts by weight of water,
with the amounts of component 1) and component 2) being such that the equivalent ratio of isocyanate groups to hydroxyl and amino groups if from 1:1 to 1.5:1.

4. The process of claim 3 wherein said non-sagging composition contains fillers.

5. The process of claim 1 wherein said shaping step is performed simultaneously with said applying step by an applicator having a round or oval opening.

6. The process of claim 1 wherein said shaping step is performed subsequently to said applying step by a squeegee having the desired step.

* * * * *